(12) United States Patent
Bock

(10) Patent No.: US 7,920,194 B2
(45) Date of Patent: Apr. 5, 2011

(54) IMAGE SENSORS WITH PIXEL RESET

(75) Inventor: Nikolai E. Bock, Pasadena, CA (US)

(73) Assignee: Aptina Imaging Corporation, George Town (KY)

( * ) Notice: Subject to any disclaimer, the term of this patent is extended or adjusted under 35 U.S.C. 154(b) by 163 days.

(21) Appl. No.: 12/406,175

(22) Filed: Mar. 18, 2009

(65) Prior Publication Data
US 2009/0180017 A1    Jul. 16, 2009

Related U.S. Application Data

(63) Continuation of application No. 11/473,312, filed on Jun. 23, 2006, now Pat. No. 7,525,587, which is a continuation of application No. 09/858,748, filed on May 16, 2001, now Pat. No. 7,274,396.

(60) Provisional application No. 60/204,372, filed on May 16, 2000.

(51) Int. Cl.
*H04N 3/14* (2006.01)

(52) U.S. Cl. ............... 348/308; 348/311; 250/208.1

(58) Field of Classification Search .............. 348/294, 348/302, 308, 309, 311, 322, 323; 250/208.1
See application file for complete search history.

(56) References Cited

U.S. PATENT DOCUMENTS

| | | | |
|---|---|---|---|
| 5,471,515 | A | 11/1995 | Fossum et al. |
| 5,831,676 | A | 11/1998 | Takahashi et al. |
| 5,898,168 | A | 4/1999 | Gowda et al. |
| 5,920,345 | A | 7/1999 | Sauer |
| 6,175,383 | B1 | 1/2001 | Yadid-Pecht et al. |
| 6,218,656 | B1 | 4/2001 | Guidash |
| 6,222,175 | B1 | 4/2001 | Krymski |
| 6,519,371 | B1 | 2/2003 | Pain et al. |

OTHER PUBLICATIONS

N.E. Bock, "Reset Noise at Low Temperatures", Journal De Physique IV, Colloque 3, supplement au Journal de Physique III, vol. 6, Apr. 1966, pp. C3-207-C3-211.
Pain et al., "Analysis and enhancement of low-light level performance of photodiode-type CMOS active pixel imagers operated with sub-threshold reset", 1999 IEEE Workshop on CCDs and Advanced Image Sensors, pp. 140-143.

*Primary Examiner* — Gevell Selby

(57) ABSTRACT

Techniques for use with image sensors include transferring a signal level from an active sensor pixel to a readout circuit, performing a flushed reset of the pixel, and isolating the pixel from the readout circuit during resetting of the pixel.

14 Claims, 4 Drawing Sheets

IMAGE SENSORS WITH PIXEL RESET

RELATED APPLICATIONS

This application is a continuation of application Ser. No. 11/473,312, filed on Jun. 23, 2006, now U.S. Pat. No. 7,525,587 which is a continuation of application Ser. No. 09/858,748, filed on May 16, 2001, now U.S. Pat. No. 7,274,396, issued Sep. 25, 2007 which claims the benefit of priority of U.S. Provisional Patent application No. 60/204,372, filed on May 16, 2000, which are hereby incorporated by reference in their entireties.

BACKGROUND

The invention relates, in general, to image sensors with pixel reset.

Image sensors find applications in a wide variety of fields, including machine vision, robotics, guidance and navigation, automotive applications, and consumer products. In many smart image sensors, it is desirable to integrate on-chip circuitry to control the image sensor and to perform signal and image processing on the output image.

Active pixel sensors (APS), which have one or more active transistors within the pixel unit cell, can be made compatible with complementary metal-oxide-semiconductor (CMOS) technologies and promise high readout rates compared to passive pixel sensors. Active pixel sensors often are arranged as arrays of elements, which can be read out, for example, a column at a time. Each column can be read out at one time, driven and buffered for sensing by a readout circuit.

A dominant source of noise for some sensors is thermal noise in the channel of the pixel's reset transistor. Such thermal noise is often referred to as kTC noise. Noise less than kTC noise can be achieved with photodiode-type pixels using soft-reset techniques. Soft, or sub-threshold, reset refers to resetting the pixel with both the drain and gate of the reset transistor maintained at substantially the same potential so that the sense node is reset using sub-threshold MOSFET current. Sub-threshold resetting of photodiode active pixel sensors, however, tends to result in higher image lag and low-light level non-linearity.

SUMMARY

A technique for use with image sensors include transferring a signal level from an active sensor pixel to a readout circuit, performing a flushed reset of the pixel, and isolating the pixel from the readout circuit during resetting of the pixel. In some implementations, the technique includes preventing a parasitic output capacitance from discharging through a load transistor in the readout circuit during the reset operation.

An integrated circuit chip is disclosed that includes an array of active sensor pixels, readout circuits and a controller for providing control signals. The integrated circuit chip can provide flushed reset of pixels in a selected row and can isolate pixels in the selected row from the associated readout circuits during resetting of the pixels. In some implementations, the integrated circuit chip can prevent a parasitic output capacitance from discharging through load transistors in the readout circuits during resetting of the pixels.

The controller can be configured for providing a first control signal to enable row selection switches in a selected row of pixels to transfer signal levels from the pixels in the selected row to the associated readout circuits, for subsequently providing a second control signal to enable reset switches in the selected row of pixels, and for causing the first control signal to disable the row selection switches in the selected row of pixels during resetting of the pixels in the selected row. Disabling the row selection switches during the reset operation isolates the pixels in the selected row from their readout circuits.

Isolating the pixels in the selected row from the associated readout circuits during resetting and preventing discharge of the output capacitance during the reset operation can help reduce or eliminate secondary image lag and non-linearity, in addition to the reduction in lag and non-linearity that may be provided by the flushed reset operation.

Other features and advantages will be readily apparent from the detailed description, the accompanying drawings and the claims.

DETAILED DESCRIPTION

Figure 1:
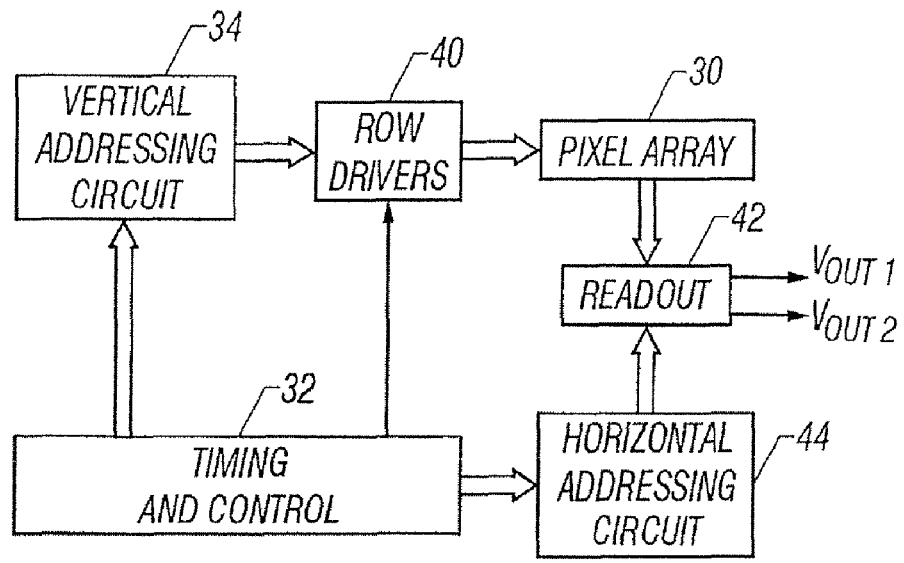
FIG. 1 is a block diagram of a CMOS active pixel sensor chip.

As shown in FIG. 1, an imaging device formed as a monolithic CMOS integrated circuit includes an array of active pixel sensors 30 and a controller 32 that provides timing and control signals to enable reading out of signals stored in the pixels. The array 30 may have dimensions, for example, of 128 by 128 pixels or 256 by 256 pixels, although, in general, the size of the array will depend on the particular implementation.

The imager can be read out a row at a time using a column parallel readout architecture. The controller 32 selects a particular row of pixels in the array 30 by controlling the operation of a vertical addressing circuit 34 and row drivers 40. Charge signals stored in the selected row of pixels are provided to a readout circuit 42. The pixels read from each of the columns then can be read out sequentially using a horizontal addressing circuit 44. Differential pixel signals (VOUT1, VOUT2) can be provided at the output of the readout circuit 42.

Figure 2:
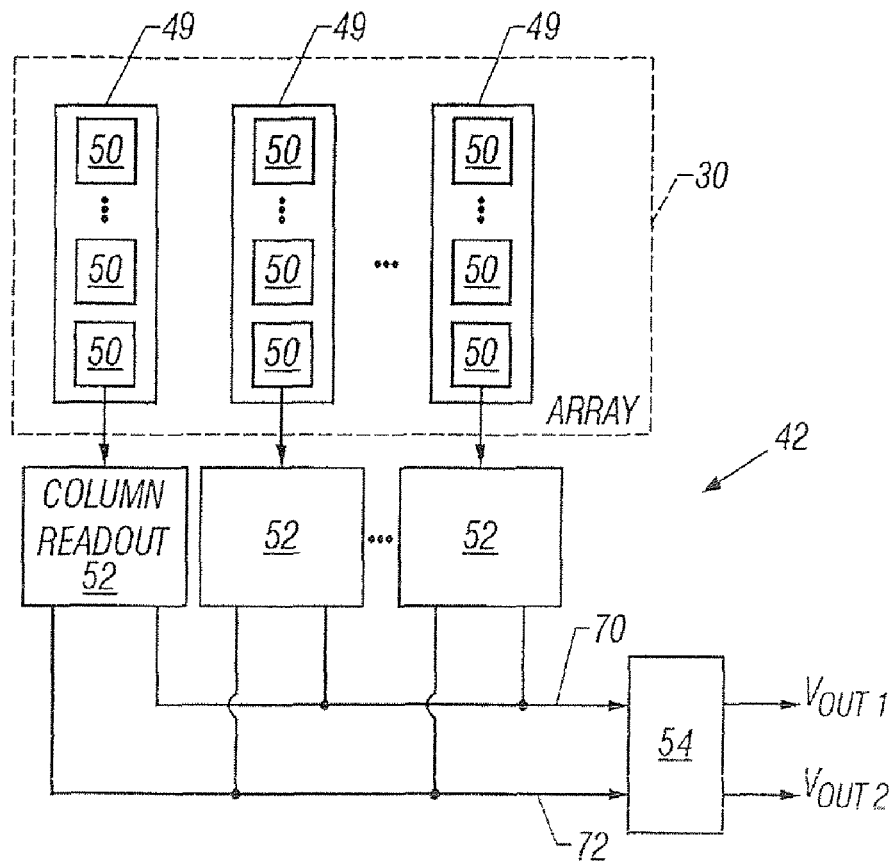
FIG. 2 is a block diagram of an array of active pixel sensors and corresponding readout circuitry.

As shown in FIG. 2, the array 30 includes multiple columns 49 of CMOS active pixel sensors 50. Each column includes multiple rows of sensors 50. Signals from the active pixel sensors 50 in a particular column can be read out to a readout circuit 52 associated with that column. Signals stored in the readout circuits 52 then can be transferred to an output stage 54 which may be common to the entire array of pixels 30. The analog output signals then are sent, for example, to a differential analog-to-digital converter (ADC).

Figure 3:
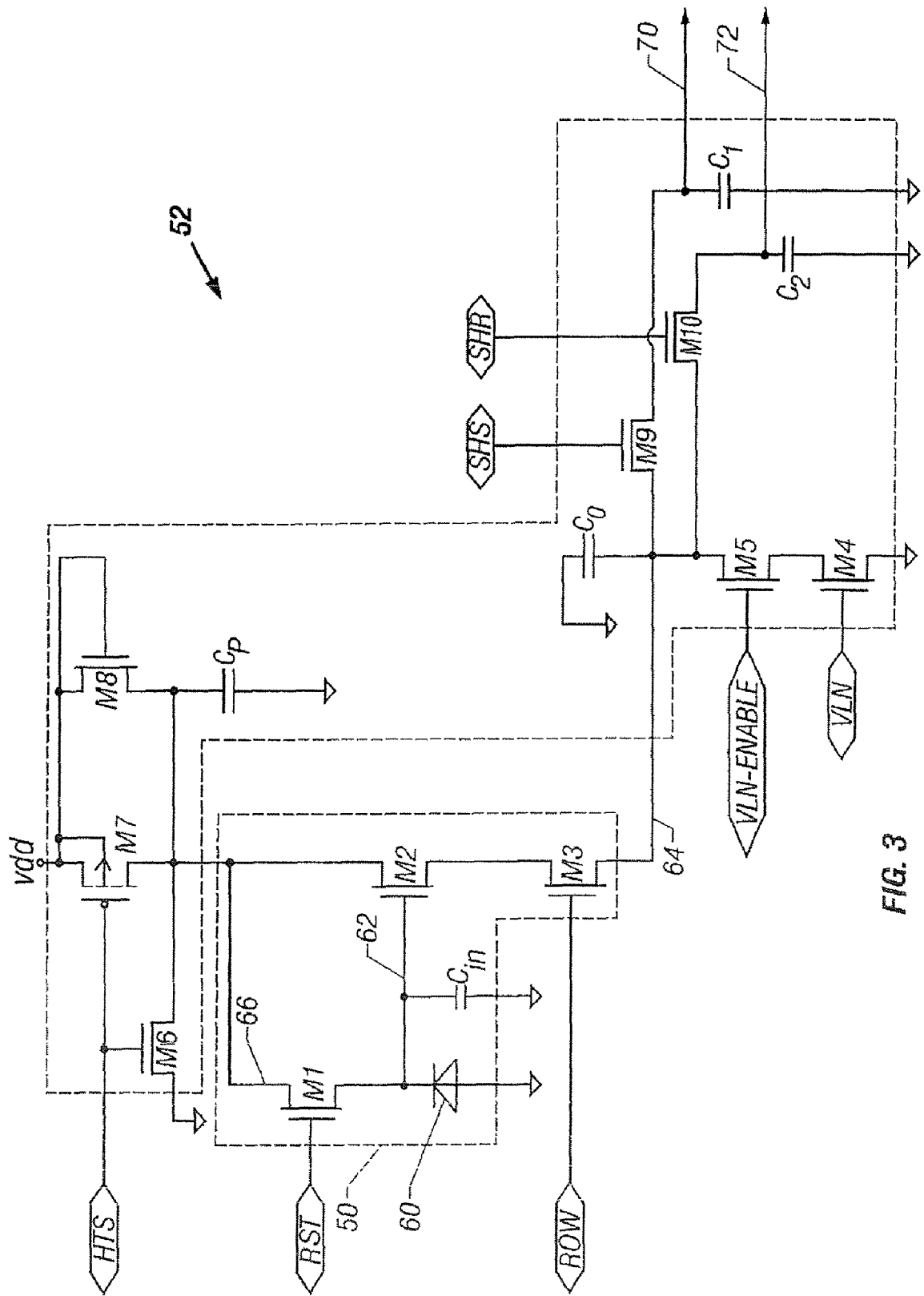
FIG. 3 illustrates details of an active pixel sensor and a column readout circuit.

As illustrated in FIG. 3, each CMOS active pixel sensor 50 includes a photo-sensitive element such as a photodiode 60 buffered by a source-follower n-channel MOS transistor M2. The pixel has an integration capacitance $C_{in}$ and includes a reset switch that can be implemented as an n-channel MOS transistor M1 controlled by a signal (RST) applied to its gate. The integration capacitance $C_{in}$ periodically is charged by current from the photodiode 60 and is reset by turning on and off the reset transistor M1. A voltage on the charge-detection (or sense) node 62 is transferred through the source-follower transistor M2 to the readout circuit 52 by enabling a row selection switch M3. The row selection switch can be implemented as an n-channel MOS transistor that is enabled by applying a high signal (ROW) to its gate. The reset and row enable signals (RST, ROW) are common to a row of pixels in the array 30 and are generated by the controller 32.

Each column readout circuit 52 includes an n-channel load transistor M4 for the source-follower transistors M2 of each pixel in the associated column 49. The load transistor is controlled by a signal (VLN) applied to its gate. Another n-channel transistor M5 is connected between the column readout bus 64 and the load transistor M4. A control signal (VLN_ENABLE) is applied to the gate of the transistor M5. When the transistor M5 is disabled, it decouples the load transistor M4 from the rest of the readout circuit 52. The signals VLN and VLN_ENABLE are generated by the controller 32.

Figure 4:
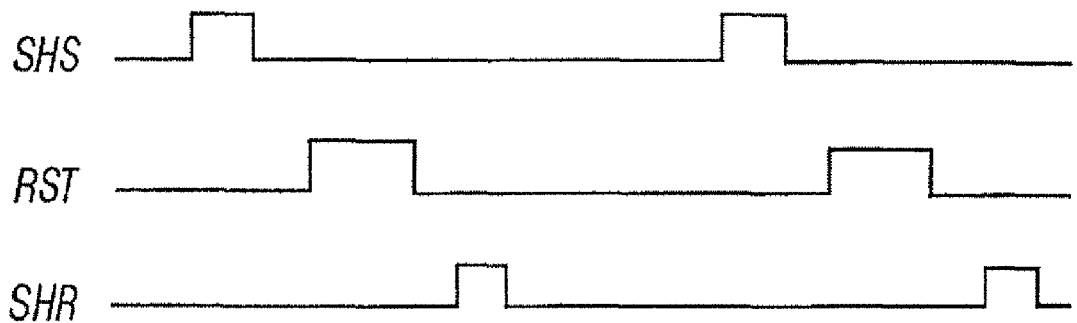
FIG. 4 is a timing diagram associated with FIG. 3

In the illustrated implementation, the readout circuit 52 includes two sample-and-hold switches, implemented as n-channel MOS transistors M9, M10. When the row selection switch M3 is enabled, the transistor M9 also is enabled by a high signal (SHS) applied to its gate to allow the selected pixel's signal level to be stored on the capacitor $C_1$. As indicated by FIG. 4, the pixel then is reset. The transistor M10 subsequently is enabled by a high signal (SHR) applied to its gate to allow the selected pixel's reset level to be stored on the capacitor $C_2$. The sample and hold signals (SHS, SHR) are generated by the controller 32 and are common to a row of pixels. Sampling both the reset and signal levels allows correlated double sampling (CDS) to be performed.

The readout circuit 52 also includes additional circuitry that allows the pixel to be flushed during the reset phase. The additional circuitry includes n-channel MOS transistors M6, M8 as well as p-channel MOS transistor M7. That circuitry controls the potential at the drain 66 of the reset transistor M1. The power supply voltage ($V_{dd}$) is routed to the column of pixels through the p-channel transistor M7 and the n-channel transistor M8 which limits the supply voltage excursion. A signal (HTS), generated by the controller 32, is applied to the gates of the transistors M6, M7.

Figure 5:
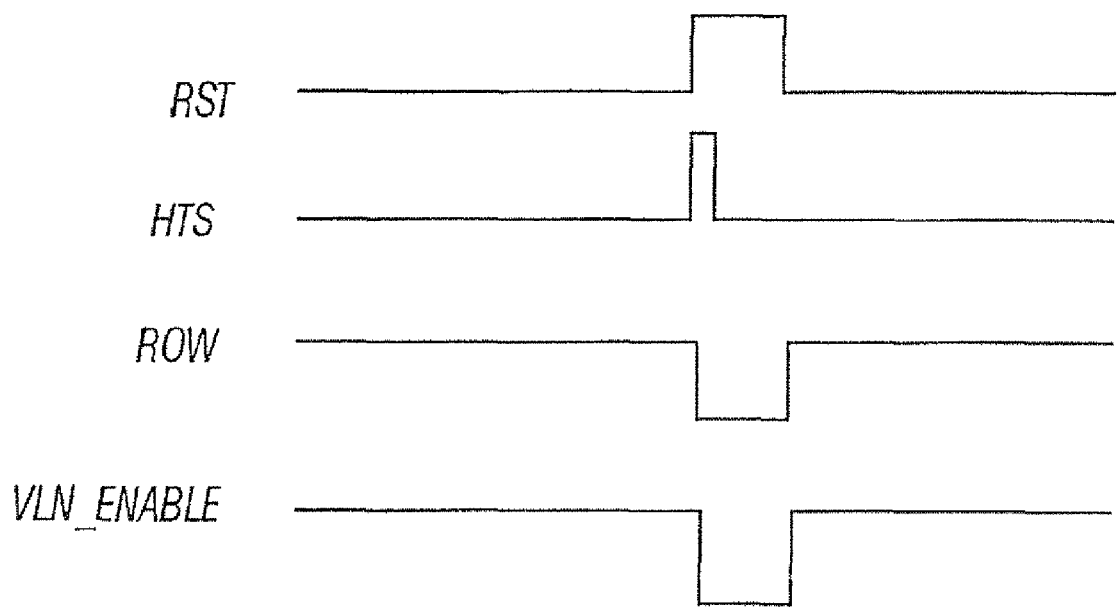
FIG. 5 is another timing diagram associated with FIG. 3.

When the pixel is reset, the signal HTS is momentarily pulsed ON (see FIG. 5). That causes the pixel to reset initially in hard reset, followed by soft reset. The parasitic power supply capacitance $C_P$ discharges through the transistor M6 when the signal HTS is pulsed. Thus, the hard reset erases the pixel memory so that the soft reset level reaches substantially the same level regardless of the strength of the optical signal on the photodiode 60.

Figure 6:
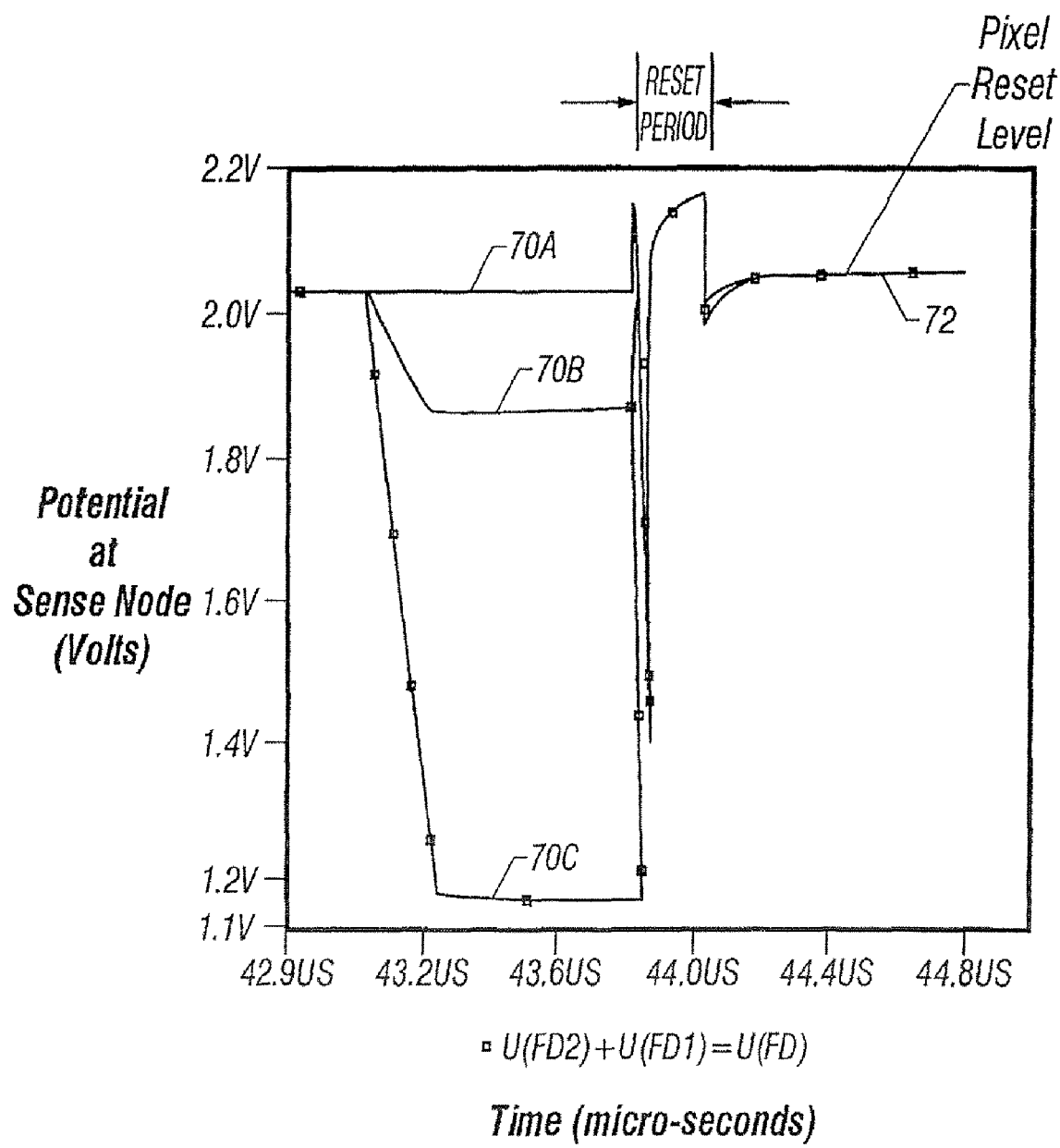
FIG. 6 illustrates results of simulated testing.

To help reduce or eliminate the signal-dependent transient current during the reset phase, the pixel output is isolated from the readout circuit 52 by disabling the row selection switch M3 during the reset operation (see FIG. 5). Disabling the row selection switch M3 prevents charge that may be stored on the parasitic output capacitance $C_O$ from influencing the equivalent pixel capacitance $C_{in}$. Results from SPICE simulations (FIG. 6) indicate that the dependency of the pixel's reset level on the signal level can be reduced significantly or eliminated. Even when the simulated pixel signal level was varied among different values 70A, 70B, 70C, the simulated pixel reset level was substantially the same.

As also shown in FIG. 5, the transistor M5 can be disabled during the reset operation to prevent the parasitic output capacitance $C_O$ from discharging through the load transistor M4. By preventing discharge of the parasitic output capacitance through the load transistor M4, the need to recharge the capacitance $C_O$ after the reset operation can be avoided. That can improve the overall operating speed of the imager and reduce overall power consumption.

In general, the dimensions of the transistors will depend on the particular application. However, examples of transistor dimensions are provided in the following chart:

| Transistor | Width (microns) | Length (microns) |
|---|---|---|
| M1 | 1.1 | 0.55 |
| M2 | 1.5 | 0.7 |
| M3 | 1.5 | 0.5 |
| M4 | 3.6 | 1.2 |
| M5 | 6 | 0.5 |
| M6 | 1.2 | 0.5 |
| M7 | 4 | 0.5 |
| M8 | 1.2 | 0.5 |

Different dimensions may be suitable for other implementations.

The foregoing technique can take advantage of flushed reset, also can reduce or eliminate the transient current through the active pixel transistors during the flush phase. Therefore, secondary image lag and non-linearity can be reduced, in addition to the reduction in lag and non-linearity that may be provided by flushed reset.

Other implementations are within the scope of the claims.

What is claimed is:

1. An imager device comprising:
    an array of pixels organized into a plurality of rows and columns, each pixel comprising a photosensitive element, a source follower transistor having a gate terminal coupled to an output of the photosensitive element, a row select switch coupled between a column output line and the source follower transistor, and a reset switch connected to the photosensitive element;
    a plurality of readout circuits, each readout circuit being associated with and coupled to a respective column of pixels, each readout circuit comprising a load transistor associated with source follower transistors in the pixels of the associated column, each readout circuit further comprising a hard reset circuit coupled to a drain of the reset transistor in the pixels of the associated column and an enabling transistor connected between the output line and the load transistor; and
    a controller adapted to:
        enable the row select switch of each pixel in a selected row to cause each pixel in the selected row to transfer a first voltage representing an amount of light impinging on a respective pixel during an integration period to the respective readout circuit, disable the row select switch of each pixel in the selected row to electrically disconnect the pixels in the selected row from the respective readout circuit, activate the hard reset circuits of the plurality of readout circuits to perform a hard reset of the pixels in the selected row, enable the reset transistor of each pixel in the selected row to perform a soft reset of the pixels in the selected row, and enable the row select switch of each pixel in the selected row to electrically connect the pixels in the selected row to the associated readout circuit and transfer a second voltage from the pixels in the selected row to the readout circuit, the second voltage representing a soft reset level for the pixels.

2. The imager device of claim 1, wherein the controller disables the enabling transistor of the plurality of readout circuits for preventing a parasitic output capacitance from discharging through the load transistor of the readout circuits during the hard and soft reset operations.

3. The imager device of claim 1, wherein the hard reset discharges a power supply capacitance present at a node coupled to the drain of each reset transistor of the pixels in the selected row.

4. The imager device of claim 1, wherein the hard reset circuit of each readout circuit comprises:
   a p-channel transistor connected between a power source and the drain of the respective reset transistor;
   a first n-channel transistor connected between the drain of the respective reset transistor and a ground potential; and
   a second n-channel transistor connected across the p-channel transistor and having a gate terminal and a drain terminal connected to the power source, wherein the controller activates the hard reset circuit by generating a control signal that enables the p-channel and first n-channel transistors.

5. An imager integrated circuit comprising:
   means for transferring a signal level from a pixel circuit to a readout circuit;
   means for performing a flushed reset of the pixel circuit;
   means for electrically isolating the pixel circuit from the readout circuit during a period required to perform the flushed reset of the pixel circuit, wherein the isolating occurs during an entirety of each period required to perform the flushed reset of the pixel circuit; and
   means for preventing a parasitic output capacitance from discharging through a load transistor in the readout circuit during the reset, wherein said means for preventing the parasitic output capacitance from discharging comprises means for opening a switch coupled between the load transistor and an output line connected to the pixel circuit.

6. An imager integrated circuit comprising:
   means for transferring a signal level from a pixel circuit to a readout circuit;
   means for performing a flushed reset of the pixel circuit; and
   means for electrically isolating the pixel circuit from the readout circuit during a period required to perform the flushed reset of the pixel circuit, wherein the isolating occurs during an entirety of each period required to perform the flushed reset of the pixel circuit, wherein said isolating means comprises means for disabling a row select transistor switch in the pixel circuit when the pixel circuit is being reset.

7. An imager integrated circuit comprising:
   means for transferring a signal level from a pixel circuit to a readout circuit;
   means for performing a flushed reset of the pixel circuit; and
   means for electrically isolating the pixel circuit from the readout circuit during a period required to perform the flushed reset of the pixel circuit, wherein the isolating occurs during an entirety of each period required to perform the flushed reset of the pixel circuit, wherein said means for isolating the pixel circuit comprises means for disabling a row selection switch for the duration of the flushed reset, and said circuit further comprises means for preventing a parasitic output capacitance from discharging through a load transistor in the readout circuit during the reset.

8. An imager integrated circuit comprising:
   means for transferring a signal level from a pixel circuit to a readout circuit;
   means for performing a flushed reset of the pixel circuit; and
   means for electrically isolating the pixel circuit from the readout circuit during a period required to perform the flushed reset of the pixel circuit, wherein the isolating occurs during an entirety of each period required to perform the flushed reset of the pixel circuit, wherein said means for performing a flushed reset comprises means for performing a hard reset followed by a soft reset.

9. An imager device comprising:
   an array of pixels, each pixel being associated with a row and a column in the array, each pixel including a reset switch and a row selection switch;
   a plurality of readout circuits, each readout circuit being associated with and coupled to a respective column of pixels in the array; and
   a controller electrically connected to the array and readout circuits, said controller adapted to generate a first control signal to enable the row selection switches in a selected row of pixels to transfer signal levels from the pixels in the selected row to the associated readout circuits, said controller being adapted to generate a second control signal subsequent to the first control signal to enable the reset switches in the selected row of pixels, said controller being adapted to remove the first control signal to disable the row selection switches in the selected row of pixels and to isolate the pixels from the associated readout circuits during a period required to perform the resetting of the pixels in the selected row, wherein the isolating occurs during an entirety of each period required to perform the resetting of the pixels and wherein each pixel further comprises a source-follower transistor coupled to a photodiode and each readout circuit comprises:
   a load transistor for the source-follower transistor in the pixels associated with the readout circuit; and
   an enable switch coupled in series with the load transistor and coupled between the load transistor and an output of the pixels in the associated columns, wherein the controller is adapted to provide a third control signal for disabling the enable switch during resetting of the pixels.

10. The device of claim 9, wherein each readout circuit comprises hard reset circuitry for performing a flushed reset of the pixels associated with that readout circuit when the controller generates a third control signal.

11. The device of claim 10, wherein the controller generates the third control signal while generating the second control signal that enables the reset switches in the selected row of pixels.

12. An imager device comprising:
   an array of pixels, each pixel being associated with a row and a column in the array, each pixel including a reset switch and a row selection switch;
   a plurality of readout circuits, each readout circuit being associated with and coupled to a respective column of pixels in the array; and
   a controller electrically connected to the array and readout circuits, said controller adapted to generate a first control signal to enable the row selection switches in a selected row of pixels to transfer signal levels from the pixels in the selected row to the associated readout circuits, said controller being adapted to generate a second control signal subsequent to the first control signal to enable the reset switches in the selected row of pixels, said controller being adapted to remove the first control signal to disable the row selection switches in the selected row of pixels and to isolate the pixels from the associated readout circuits during a period required to perform the resetting of the pixels in the selected row, wherein the isolating occurs during an entirety of each period required to perform the resetting of the pixels, wherein each readout circuit comprises hard reset circuitry for performing a flushed reset of the pixels associated with that readout circuit when the controller generates a third control signal and wherein the reset switch comprises a reset transistor and the hard reset circuitry comprises:

- a p-channel transistor connected between a power source and the drain of the respective reset transistor, the p-channel transistor having a gate terminal connected to receive the third control signal;
- a first n-channel transistor connected between the drain of the respective reset transistor and a ground potential, the first n-channel transistor having a gate terminal connected to receive the third control signal; and
- a second n-channel transistor connected across the p-channel transistor and having a gate terminal and a drain terminal connected to the power source, wherein the hard reset circuitry is activated when the third control signal enables the p-channel and first n-channel transistors.

13. An imager device comprising:

an array of pixels, each pixel being associated with a row and a column in the array, each pixel including a reset switch and a row selection switch;

a plurality of readout circuits, each readout circuit being associated with and coupled to a respective column of pixels in the array; and a controller electrically connected to the array and readout circuits, said controller adapted to generate a first control signal to enable the row selection switches in a selected row of pixels to transfer signal levels from the pixels in the selected row to the associated readout circuits, said controller being adapted to generate a second control signal subsequent to the first control signal to enable the reset switches in the selected row of pixels, said controller being adapted to remove the first control signal to disable the row selection switches in the selected row of pixels and to isolate the pixels from the associated readout circuits during a period required to perform the resetting of the pixels in the selected row, wherein the isolating occurs during an entirety of each period required to perform the resetting of the pixels, wherein each readout circuit comprises hard reset circuitry for performing a flushed reset of the pixels associated with that readout circuit when the controller generates a third control signal and wherein the hard reset discharges a power supply capacitance present at a node coupled to the drain of the pixel reset transistor.

14. The imager device of claim 9, wherein the controller disables the enabling transistor for preventing a parasitic output capacitance from discharging through the load transistor of the readout circuit during the flushed reset.

* * * * *